(12) United States Patent
Ge

(10) Patent No.: US 9,201,852 B2
(45) Date of Patent: Dec. 1, 2015

(54) METHOD FOR IN-BROWSER VISUAL HTML EDITING VIA BI-DIRECTIONAL NAVIGATION AND VIRTUAL PROPERTIES

(71) Applicant: David Wei Ge, Kirkland, WA (US)

(72) Inventor: David Wei Ge, Kirkland, WA (US)

(73) Assignee: David Wei Ge, Kirkland, WA (US)

( * ) Notice: Subject to any disclaimer, the term of this patent is extended or adjusted under 35 U.S.C. 154(b) by 292 days.

(21) Appl. No.: 13/902,674

(22) Filed: May 24, 2013

(65) Prior Publication Data

US 2014/0351692 A1   Nov. 27, 2014

(51) Int. Cl.
*G06F 17/22* (2006.01)
*G06F 17/24* (2006.01)

(52) U.S. Cl.
CPC .......... *G06F 17/2247* (2013.01); *G06F 17/245* (2013.01)

(58) Field of Classification Search
CPC ...... G06F 17/2247; G06F 17/245; G06F 8/33
USPC .......... 715/234, 235; 717/106, 108, 109, 110, 717/111
See application file for complete search history.

(56) References Cited

U.S. PATENT DOCUMENTS

| | | | | |
|---|---|---|---|---|
| 5,956,736 | A * | 9/1999 | Hanson et al. | 715/234 |
| 6,558,431 | B1 * | 5/2003 | Lynch et al. | 715/210 |
| 6,560,616 | B1 * | 5/2003 | Garber | |
| 7,107,543 | B2 * | 9/2006 | Berry et al. | 715/749 |
| 7,194,680 | B1 * | 3/2007 | Roy et al. | 715/205 |
| 7,278,098 | B1 * | 10/2007 | Boye et al. | 715/210 |
| 7,941,748 | B1 * | 5/2011 | Sundermeyer et al. | 715/255 |
| 8,181,104 | B1 * | 5/2012 | Helfand et al. | 715/234 |
| 8,650,484 | B1 * | 2/2014 | Adams et al. | 715/255 |
| 2002/0091725 | A1 * | 7/2002 | Skok | 707/501.1 |
| 2002/0188636 | A1 * | 12/2002 | Peck et al. | 707/530 |
| 2003/0025730 | A1 * | 2/2003 | Brennan | 345/760 |
| 2004/0205493 | A1 * | 10/2004 | Simpson et al. | 715/501.1 |
| 2005/0240869 | A1 * | 10/2005 | Leetaru et al. | 715/530 |
| 2006/0161886 | A1 * | 7/2006 | Ge | 717/106 |
| 2007/0061710 | A1 * | 3/2007 | Chartier | G06F 17/227 715/234 |
| 2007/0089053 | A1 * | 4/2007 | Uhlig et al. | 715/513 |
| 2008/0134019 | A1 * | 6/2008 | Wake et al. | 715/239 |
| 2008/0172608 | A1 * | 7/2008 | Patrawala et al. | 715/255 |
| 2008/0209311 | A1 * | 8/2008 | Agronik et al. | 715/234 |
| 2009/0006454 | A1 * | 1/2009 | Zarzar et al. | 707/102 |
| 2009/0150766 | A1 * | 6/2009 | Fukuda | G06F 17/227 715/235 |
| 2009/0259949 | A1 * | 10/2009 | Verlaan et al. | 715/760 |
| 2010/0037168 | A1 * | 2/2010 | Thayne et al. | 715/769 |
| 2010/0153544 | A1 * | 6/2010 | Krassner et al. | 709/224 |
| 2011/0138268 | A1 * | 6/2011 | Zhang et al. | 715/239 |
| 2011/0320964 | A1 * | 12/2011 | Gambhir et al. | 715/756 |
| 2013/0179761 | A1 * | 7/2013 | Cho et al. | 715/202 |
| 2014/0195892 | A1 * | 7/2014 | Hampton | G06F 17/24 715/234 |
| 2014/0237350 | A1 * | 8/2014 | Ryall et al. | 715/234 |
| 2014/0304682 | A1 * | 10/2014 | Taylor | G06F 9/45529 717/113 |
| 2014/0359574 | A1 * | 12/2014 | Beckwith | G06F 8/33 717/113 |
| 2015/0012818 | A1 * | 1/2015 | Reichmann et al. | 715/236 |

* cited by examiner

*Primary Examiner* — John Villecco
(74) *Attorney, Agent, or Firm* — David Wei Ge

(57) ABSTRACT

This invention is related to a cross-browser "What You See Is What You Get" Visual HTML editor. The editor does not require HTML coding and provides full HTML editing power by targeting HTML elements, not just rich text formatting, by providing visual editing processes for HTML specific characteristics not found in document-centric editors; the characteristics include hierarchical nature of elements, hidden elements, CSS styles and style sharing. The editor uses caret-sensitive element selection, parent-element list, child-element accessing, virtual properties, automated CSS creations and CSS style sharing, and element-specific command list.

9 Claims, 2 Drawing Sheets

METHOD FOR IN-BROWSER VISUAL HTML EDITING VIA BI-DIRECTIONAL NAVIGATION AND VIRTUAL PROPERTIES

TECHNICAL FIELD

Embodiments of the present invention relate to the field of browser-based HTML document editing. In particular, embodiments of this invention relate to an approach of browser-based HTML contents editing in a "What You See Is What You Get" manner. In particular, the processes of the embodiments of the present invention edit HTML contents on selected elements via virtual properties and automatic CSS creations, which differ from commonly adopted approaches of mimicking word-processing in browser-based visual HTML editing, which edit and format HTML contents on selected text.

BACKGROUND ART

There are two types of visual HTML editors: standalone programs and in-browser editors. A standalone HTML editor may use all functionality provided by the Operating System it runs under. But an in-browser HTML editor is hosted in a web browser and thus it can only use functionality available from a web browser; it also subjects to security restrictions imposed by a web browser.

This invention is in the field of in-browser visual HTML editing. It is also referred to as "browser-based HTML editing", "in-place HTML editing", "in-browser HTML editing", "online HTML editing", "online rich-text editor" (see en.wikipedia.org/wiki/Online_rich-text_editor), "Through the Web (TTW) editor" (see www.geniisoft.com/showcase.nsf/WebEditors), etc.

An "in-browser" visual HTML editor uses the contents editing capabilities provided by a web browser. Usually such an editor is created in JavaScript.

In-browser visual HTML editing is now supported by most browsers for "What You See Is What You Get (WYSIWYG)" HTML editing. Industry standardization is progressing on this field.

WYSIWYG document editing allows the user to edit a document while the document is displayed in its formatted viewing form. Standalone programs such as Microsoft Word, Adobe Acrobat, etc., all provide WYSIWYG document editing.

A traditional WYSIWYG document editor works by providing a set of buttons and a set of menus for executing editing commands on the selected document text or the text under caret.

Traditional ways of WYSIWYG document editing is adopted by all state-of-art browser-based HTML editors. Actually it is considered a major design goal of a browser-based visual HTML editor to mimic traditional WYSIWYG document editing (see en.wikipedia.org/wiki/Online_rich-text_editor).

Microsoft added an "execCommand" function to the web page's DOM object, "document", and added a set of HTML editing commands to its Internet Explorer web browser (see msdn.microsoft.com/en-us/library/ms536419.aspx). Most of other web browsers followed what Microsoft did and added supports of "execCommand" function and the editing commands the Internet Explorer uses (see www.quirksmode.org/dom/execCommand.html, tifftiff.de/contenteditable/compliance_test.html, and ehsanakhgari.org/blog/2010-03-08/thoughts-future-web-based-html-editors). With such support from a web browser, a browser-based HTML editor can be made like a word-processor: a toolbar can be created to execute editing commands provided by the browser.

The HTML editing commands are being standardized by W3C (see www.whatwg.org/specs/web-apps/current-work/#editing-apis, dvcs.w3.org/hg/editing/raw-file/tip/editing.html, and www.w3.org/community/editing/).

There is a large number of in-browser HTML editors available from the internet (see en.wikipedia.org/wiki/Online_rich-text_editor and www.geniisoft.com/showcase.nsf/WebEditors). All of them provide a word processor user interface.

EditLive claims that it is a "Word processing for the web" (see editlive.com/features).

CKEditor is adopted by many products, and it promotes itself by saying that "It brings to the web common editing features found on desktop editing applications like Microsoft Word and OpenOffice." (see ckeditor.com/what-is-ckeditor)

Asbru is for web developers/programmers. It uses a toolbar to provide a set of commands for editing HTML contents (see editor.asbrusoft.com/).

Tinymce is for embedding visual HTML editing into web page. When it starts it shows a word processing user interface (see www.tinymce.com/).

Yahoo! is also putting large efforts in creating YUI Rich Text Editor (see developer.yahoo.com/yui/editor/), which converts a text area into a word processor.

SUMMARY OF INVENTION

Technical Problem

State-of-art browser-based visual HTML editors are mimicking word-processing and W3C is making standardization to help making browser-based word-processors for HTML editing. But doing such a word-processing in WYSIWYG document editing for HTML contents editing has serious problems because HTML document has its own characteristics which are significantly different than other rich formatted documents such as Microsoft Word, Adobe PDF file, etc.

One problem is related to the using of CSS. CSS is a major way of HTML authoring. But it requires writing text code and it targets elements, not text. A word-processor is for editing text, it is very difficult to include CSS. Some survey says that "WYSIWYG editor designers have been struggling ever since with how best to present these concepts to their users without confusing them by exposing the underlying reality. Modern WYSIWYG editors all succeed in this to some extent, but none of them has succeeded entirely." (see htmleditor.in/index.html). Even for a very popular editor like CKEditor (see ckeditor.com/what-is-ckeditor), it cannot allow end users to use CSS; it only allows a developer to write CSS code to provide new formatting for end users; that is one kind of "succeed in this to some extent".

Another problem relates to the hierarchical nature of HTML contents. Suppose an HTML element has two levels of parents. For accurate HTML editing, an editor should allow the user to apply styles, for example, font, to the element or to each level of parent element. State-of-art word-processor editors apply text attribute modifications to selected text, not to elements.

Another problem is related to the command parameters. For example, the commands for setting font family and font size need command parameters for specifying font family name and font size. For a state-of-art WYSIWYG document editor, dropdown lists are displayed in a toolbar for selecting font family and font size. FIG. 1 shows a typical state-of-art word-processing style editor 101. There is a dropdown list 102 for selecting font family. There is a dropdown list 103 for selecting font size. There are a set of command buttons 104 for doing various editing not requiring command parameters. But for editing HTML contents, there are lots of other editing operations which also need parameters. For example, setting "href" of an anchor needs a parameter for specifying hyper link URL; setting "alt" attribute of an image needs a parameter for specifying the image description; etc. It will be unpractical for every command parameter to add one dropdown list box or a text box on an editor toolbar. State-of-art editors use dialogue boxes to solve the problem. Using too many dialogue boxes is disrupting and inconvenient for a user.

Another problem is the reviewing/editing of hidden attributes. For documents other than HTML, almost all attributes are for document display. For a HTML document, lots of attributes are not for controlling display. For hidden elements like HEAD element, META elements, STYLE elements, SCRITP elements, and LINK elements, it is difficult to use a word-processor editor to edit those elements because these hierarchical elements are not visible document contents.

The problems with a word-processing WYSIWYG HTML editor make it limited in getting required HTML features comparing to code-based text editors.

Since W3C is making standardization to help making word-processors for HTML editing, and all state-of-art browser-based visual HTML editors are word-processors, it is not obvious that a totally different approach can be advantageous.

Solution to Problem

The embodiments of the present invention provide processes for creating an element-targeting in-browser WYSI-WYG HTML editor. The processes provide a bi-directional element navigation allowing navigation of elements from lowest level to the top-most level which is shown by 207 in FIG. 2, 307 in FIG. 3 and 407 in FIG. 4, and from a higher level to a lower level, and thus provide an element-targeting editor. The processes combine visual attribute setting with automatic CSS class generation using virtual properties, and thus allow the user to virtually and visually use CSS without actually writing CSS code.

The embodiments of the present invention provide processes for obtaining lowest level HTML element covering caret; for showing the said lowest level element and all levels of parent element all the way to <HTML> element; for navigating downwards to all levels of child elements from an element. Some elements cannot be accessed by obtaining an element covering caret and all levels of parent elements. For example, <HEAD> element under <HTML>, <META> under <HEAD>, <INPUT type="hidden"> under <BODY>, etc. <HEAD> can be accessed by downwards navigating from <HTML>, <META> can be accessed by downwards navigating from <HEAD>, <INPUT type="hidden"> can be accessed by downwards navigating from <BODY>, etc. Thus, all elements on a web page can be visually accessed and edited, forming an element-targeting editing, suitable for hierarchical nature of HTML elements.

The embodiments of the present invention provide processes for mapping CSS styles into virtual properties. A traditional object property value only belongs to one object; a virtual property value belongs to a group of HTML elements. The processes form a CSS based visual element editing. The invention of virtual properties also solves command parameters problem in a word-process approach. All command parameters can be virtual property values.

The embodiments of the present invention provide a foundation for future innovations in the field of browser-based visual HTML editors. For example, a virtual property may relate to more than one CSS style and graphic user interfaces may be used for creating CSS styles in different innovative visual approaches. One CSS style may also be represented by more than one virtual property. For example, each of the parameters for a linear-gradient style can be represented by one virtual property.

The embodiments of the present invention provide processes for putting a selected element into design mode by showing all the attributes and virtual properties of the said selected element for editing, by presenting all editing commands for the said selected element, including element hierarch navigation commands. Thus, all attributes and styles can be easily edited, including hidden attributes, attributes of hidden elements, and commands with parameters showing as attributes and virtual properties.

As shown in FIG. 2, the user interface of the Editor 201 is formed by an HTML element list 204 (hereafter referred to as the Parent List) for listing an HTML element and all levels of parents of the element, a property grid 206 (hereafter referred to as the Property Grid) for showing and editing all attributes and virtual properties of an element, and an element-specific command list 205 (hereafter referred to as the Command List) for editing an element.

A caret is the point of the text insertion, as shown by 208 in FIG. 2, 308 in FIG. 3 and 408 in FIG. 4. All major web browsers support detection of caret. When a caret location is moved, the lowest level of the HTML element at the caret location is detected. The detected element and all levels of its parent elements are displayed in the Parent List. The user may select an element from the Parent List. When the item selection of the Parent List changes, all attributes and virtual properties of the selected element are displayed in the Property Grid, and element-specific editing commands are displayed in the Command List.

The items listed in the Property Grid are not just HTML attributes defined by W3C. All commands requiring parameters can be made into attributes. Setting an attribute value triggers an execution of the corresponding command. Thus there is not a need to put dropdowns on an editor toolbar for a command, and there is not a need to use dialogue boxes. Thus it solves the problem of too many parameter-requiring commands for a word-processor.

If an element supports CSS styles then the Property Grid includes a virtual property named styleName. It is a string property only available during editing. If styleName is given a value then it is included in the class names for the element. Each CSS style of the element becomes a virtual property in the Property Grid; the virtual property value is the computed style value of the element; when the virtual property value is modified by the user, the modified value becomes a CSS style value in a CSS style sheet for the page, the selector of the CSS style value depends on the styleName value; if styleName is empty then the selector is the tag name of the element, if styleName is not empty then the selector is the tag name of the element plus a dot and followed by styleName.

The above virtual property processes allow all elements with the same styleName value share the same CSS styles. Unlike a traditional property, the value for a virtual property representing a CSS style does not belong to a specific element, the value belongs to a CSS class. Such processes can be extended to use multiple styleName for generating virtual properties; each styleName corresponds to a group of CSS styles; for example, text formatting styles, box styles, background styles, etc.

The above virtual property processes can be extended beyond standard HTML elements defined by W3C standards. One or more elements may form an element providing particular functionality, for example, a menu bar, tree view, etc. The styling of such non-standard elements can also be mapped to virtual properties in the same way as standard elements.

The parent list makes it easy to navigate through hierarchical elements. Combined with visual property-setting, it is easy to apply editing to each level of element hierarch. Thus it provides more accurate style editing than mimicking word-processor.

The user of the Editor modifies HTML contents by typing in the browser, modifying element attributes and virtual properties in the Property Grid, and executing commands from the Command List, inserting new elements in caret location, and deleting unwanted elements.

Since all web browsers provide HTML editing capability in the way of word-processing, creating an element-targeting editor may face some difficulty.

One problem is that for most web browsers the cursor cannot be positioned between two elements, hence it is difficult to insert a new element between two existing elements. This invention uses following processes to solve the problem.

The invention uses an "add space" operation to allow the user to insert a space between two existing elements. After inserting a space between two existing elements, the cursor can be placed in the space between the two existing elements and therefore new elements can be inserted between the two existing elements.

The invention uses a "level-up" operation to make an element become a sibling of its parent element. This operation provides another way for the user to insert a new element into a desired location. For example, suppose the user wants to insert a SPAN between two DIV elements. The user may first make the first DIV the selected-element and insert a new SPAN into the first DIV; the user then uses the "level-up" operation to make the SPAN a sibling of the first DIV and thus the SPAN is located between the two DIV elements.

Advantageous Effects of Invention

By implementing the present invention, an element-targeting in-browser WYSIWYG HTML editor can be created which provides much more accurate and powerful editing than a state-of-art editor which mimics word-processors. Element-targeting editing makes it possible to use CSS. A virtual CSS applying process makes it possible for end users to use CSS in an in-browser WYSIWYG HTML editor without writing CSS code. Element-targeting editing makes it easy to edit attributes and elements not to be displayed visually on a HTML page.

By creating virtual properties and using scrollbars, in a limited screen space a Property Grid may list a large number of element CSS styles for editing and sharing. For implementing an editing command, which requires a parameter, the Editor may simply add a virtual property in the Property Grid; the required command parameter will be the virtual property value. Large number of parameter-requiring commands can thus be easily implemented by the Editor without a single dialogue box. Any kinds of attributes can be included in the Property Grid, including hidden attributes.

The user of the Editor may navigate to any HTML element by locating the caret to a desired location and selecting desired element from the Parent List. The user of the Editor may view and modify any attribute by selecting the desired element and modifying the desired attribute from the Property Grid. The elements and attributes to be modified can be invisible from the browser. For example, the user may edit HEAD contents by selecting the <HTML> element from the Parent List; when caret is in a TD element the user may edit attributes of the TD, the user may also easily edit its parent elements such as TR, THEAD, TFOOT, TBODY, TABLE, etc., the user may also easily edit column CSS styles related to the TD.

The Editor uses the Command List to provide editing operations based on specific element. For example, when a TD element is selected, a set of commands for splitting column, splitting cell, splitting row, merging columns, merging cells, merging rows, etc., may appear in the Command List. Although available commands for all kinds of elements can be huge, but because at any time only the commands specific to the selected element are displayed, the Command List does not need large screen space.

Thus the Editor, occupying a small part of screen space, provides much more editing power than a word-processor toolbar.

This invention also solves a cross-browser compatibility problem because it does not rely on the editing commands provided by web browsers (see www.quirksmode.org/dom/execCommand.html and ehsanakhgari.org/blog/2010-03-08/thoughts-future-web-based-html-editors).

DESCRIPTION OF EMBODIMENTS

One embodiment of this invention is by using JavaScript to create an absolutely positioned DIV element, hereafter referred to as the Editor-DIV, to hold all components forming an in-browser HTML editor, and moving and resizing the Editor-DIV change the location and size of the Editor.

Figure 1:
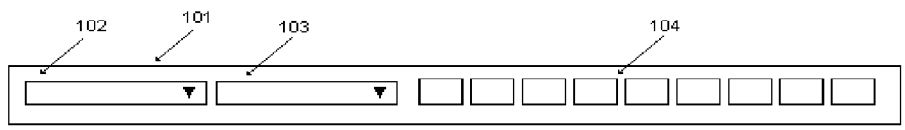
FIG. 1 shows a typical word-processor
Figure 2:
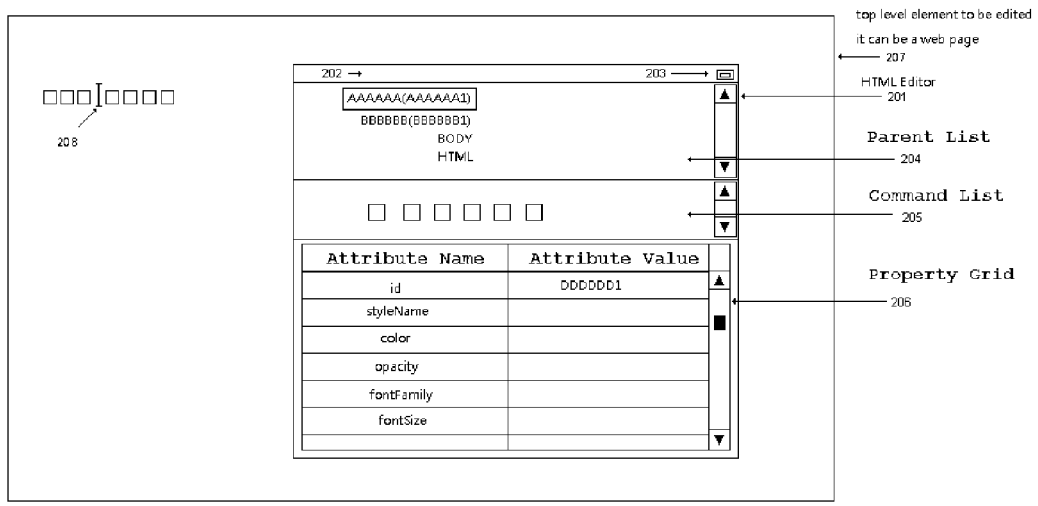
FIG. 2 shows a typical implementation of this invention. It can be a floating window or a docked window. It may be minimized to show more editing space.
Figure 3:
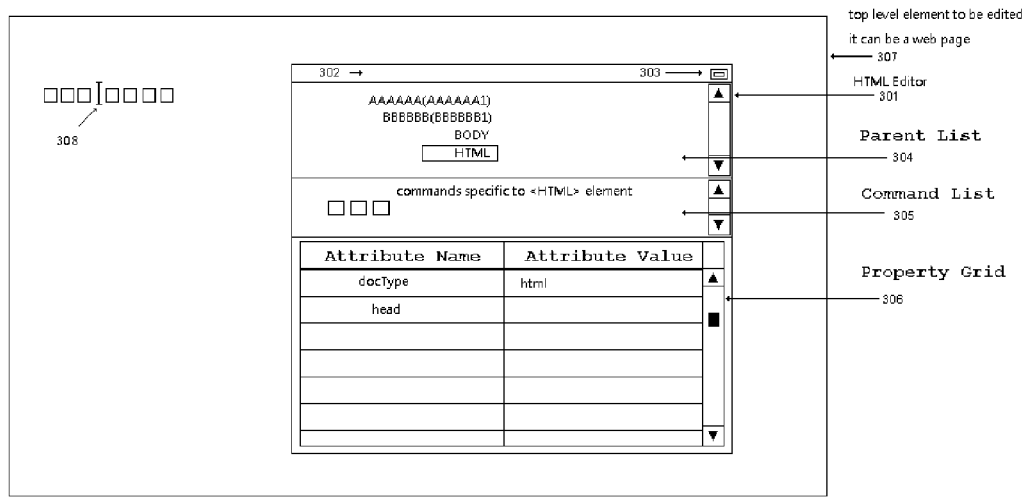
FIG. 3 shows a typical implementation of this invention. It shows that <!DOCTYPE> setting of an HTML page is displayed and edited in the property grid as a virtual property "docType".
Figure 4:
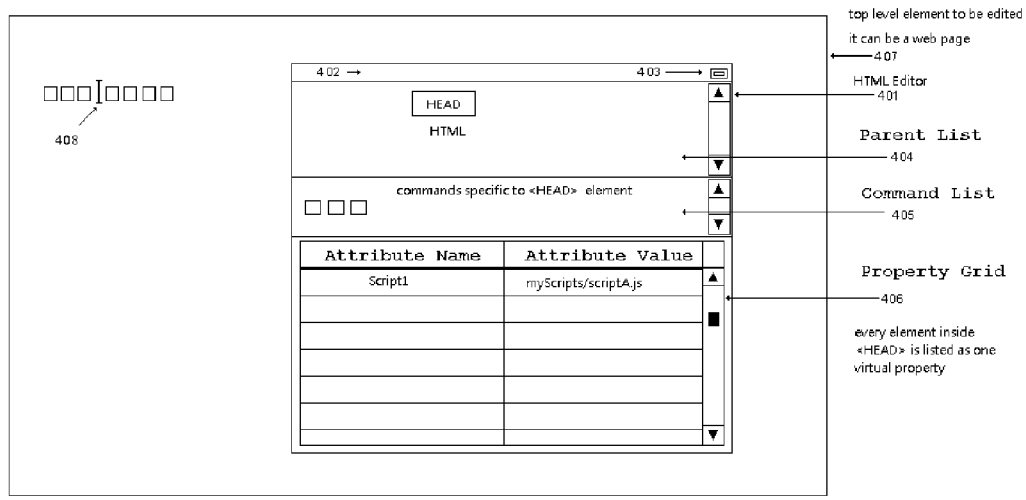
FIG. 4 shows a typical implementation of this invention. It shows a process of "accessing child elements" of claim 7.

With reference to FIG. 2, FIG. 3 and FIG. 4, the outer box shown by 201, 301 and 401 represents the Editor-DIV element.

Title bar shown by 202, 302 and 402 can be implemented by another DIV element. Title bar shown by 202, 302 and 402 may serve as a mouse event capturing area for allowing the user to move the Editor around the web page.

Minimize-button shown by 203, 303 and 403 can be implemented by an IMG element. Clicking Minimize-button 203, 303 and 403, the Editor-DIV's height is reduced to only holding Title bar shown by 202, 302 and 402. Clicking Minimize-button 203, 303 and 403 again, the Editor-DIV's height restores to its original height.

Parent List shown by 204, 304 and 404 is a SELECT element. An array of HTML elements is associated with Parent List 204, 304 and 404. The first array item is the Base-Element. The Base-Element is the deepest level of HTML element covering the caret or text selection on the web page. Each of other array items is the parent element of the previous array item. Parent List 204, 304 and 404 has the same number of items as the element array. Each item of Parent list shown by 204, 304 and 404 is a text representation of the corresponding element in the element array. The text representation of an element is formed by element id, element name and element tag name. The HTML element corresponding to the selected item of Parent List shown by 204, 304 and 404 is called the Selected Element.

Command List shown by 205, 305 and 405 is a DIV element. Each command can be an IMG element. Depending on the Selected-Element, different set of commands are created and displayed in Command list 205. For example, if the Selected-Element is a TD then among the other standard commands, there are following commands: add new row below; add new row above; add new column on left; add new column on right; merge with left cell; merge with right cell; merge with above cell; merge with cell below; split cell horizontally; split cell vertically, and show column styles. When a TR becomes the Selected-Element, there are commands for adding new row below and adding new row above. When a TABLE becomes the Selected-Element, there are commands for adding THEAD, adding TFOOT, selecting THEAD and selecting TFOOT. If the Selected-Element may contain child elements then there is a command for adding new child elements. Clicking "add new child" command, a list of all addable element types are displayed. Clicking an element type, a new child of the selected element type is created and placed inside the Selected-Element. If the Selected-Element can be removed then there is a command for removing the Selected-Element. If the Selected-Element can be a sibling of its parent element then there is a "level-up" command; clicking the "level-up" command, the Selected-Element will be removed from its parent element and re-added back as the next sibling of its original parent element. If the Selected-Element can be removed and its innerHTML attribute can be valid contents of the Selected-Element's parent element then there is a "un-tag" command; clicking the command will remove the Selected-Element and add the innerHTML of the Selected-Element to the original location of the Selected-Element.

Command List shown by 205, 305 and 405 may contain an IMG element acting as a "Finish" button. Clicking the "Finish" button, an HTML text of the element being edited is generated according to the type of the element being edited; a CSS file will also be generated according to the virtual property settings.

Property Grid shown by 206, 306 and 406 contains all attributes and virtual properties of the selected element for viewing and editing.

INCORPORATION-BY-REFERENCE

| Source code file name | File size | Description |
| --- | --- | --- |
| htmlEditor_js.txt | 375,662 bytes | A JavaScript file implementing processes of claim 1, claim 3, claim 4, claim 5, claim 7, claim 8, claim 9 |
| htmlEditorClient_js.txt | 55,470 bytes | A JavaScript file implementing processes of claim 1, claim 2, claim 3, claim 4, claim 6, claim 8 |

Example 1

Source code—file name: htmlEditor_js.txt, line numbers: 7113-7136, the line 7113 contains following words: 'Setting styleName to a non-empty string will add it as a class name to the element; all your modifications of the element styles will be added to the class and thus applied to all elements using the class. Note that setting styleName to an empty string will not remove the existing class which may be used by other elements. To remove classes you may do it via the HTML element. If styleName is empty then all your style modifications will be applied to the same type of elements which do not use classes.'

The processes of Claim 1 create a virtual property "style name". Lines from 7310 to 7333 define said virtual property. "byAttribute" is true indicating that the value will be stored in an element as an attribute. "editor" is EDIT_ENUM indicating that when setting the property a list of values will be displayed for the user to select, the list of values come from a function named "values". "allowEdit" is true indicating that the user may enter new value besides selecting a value from a list. "values" is a function which gives a list of previously entered values, the returned list of this function will be used by the Editor to show a dropdown list box. "setter" is a function which is executed when the user sets the value for this virtual property. The function retrieves existing attribute of "styleName"; sets the "styleName" attribute to the new value; if the existing "styleName" attribute is not empty then remove it from the class names of the element. "onsetprop" is a function to be executed after setting the property value, it adds the value to the class names of the element.

Example 2

Source code—file name: htmlEditor_js.txt, line numbers: 501-681, function name: captureSelection The processes of Claim 1 create an in-browser HTML editor targeting HTML elements. In this example, function captureSelection is executed when caret location is moved. This function locates the HTML element covering the current caret, as the base-element of Claim 1. If there is a selection range on the web page then it tries to find the element covering the range, as the base-element of Claim 1.

Example 3

Source code—file name: htmlEditor_js.txt, line numbers: 5272-5344, function name: selectEditElement The processes of Claim 1 create an in-browser HTML editor targeting HTML elements. In this example, function selectEditElement takes a given element and sets it as the base-element of Claim 1 by calling function showSelectionMark (see Example 4) and showProperties (see Example 5).

Example 4

Source code—file name: htmlEditor_js.txt, line numbers: 2106-2163, function name: showSelectionMark The processes of Claim 1 create an in-browser HTML editor targeting HTML elements. In this example, function showSelectionMark takes a given element and sets it as the base-element of Claim 1 by showing a red dot on the base-element and showing the base-element and all levels of its parent elements in a list.

Example 5

Source code—file name: htmlEditor_js.txt, line numbers: 4461-5179, function name: showProperties The processes of Claim 1 create an in-browser HTML editor targeting HTML elements. In this example, function showProperties takes a given element as the selected HTML element of Claim 1. The function retrieves property description objects for the selected element, and saves it in a variable named "properties". From "properties" it finds all the commands and put them in the element-command-area of Claim 1. The function shows other properties in the Property Grid of Claim 1.

Example 6

Source code—file name: htmlEditorClient_js.txt, line numbers: 1288-1305, function name: _getElementSelector The processes of Claim 1 and Claim 2 create virtual properties for CSS styles. The selector for CSS styles is formed by tag name and value of "style name" virtual property of Claim 1. Function getElementSelector returns the selector for an element using the tag name and "styleName" attribute of the element (see Example 1). The function also handles tag names COL and TD specially. The function looks for the parent table element of COL and TD; checks the table element's "styleName" attribute. If the table's "styleName" is not empty then combine the selector for COL or TD with the table's selector. This coding is for such logic: COL or TD belong to a table, their style-sharing scope should be consistent with the style-sharing scope of their parent table.

Example 7

Source code—file name: htmlEditorClient_js.txt, line numbers: 1222-1246, function name: _getElementStyleValue The processes of Claim 2 create virtual properties for CSS styles. The value for a virtual property is the computed CSS styles value. Function _getElementStyleValue returns the computed CSS style value.

Example 8

Source code—file name: htmlEditorClient_js.txt, line numbers: 1306-1318, function name: _setElementStyleValue The processes of Claim 2 create virtual properties for CSS styles. When the user sets a value to a virtual property, the value is used as the style value of the corresponding CSS style. Function _setElementStyleValue applies the value to a CSS style using a selector defined by the processes of Claim 2; removes the CSS style from the element because according to the cascading rule the CSS style on the element will override CSS styles in Cascade Style Sheets; adds "styleName" to the classes of the element so that the element will use the CSS style in Cascade Style Sheets.

Example 9

Source code—file name: htmlEditor_js.txt, line numbers: 3714-3967, function name: _getElementProperties The processes of Claim 3 and Claim 4 create a set of editing commands targeting selected element. In this example, each editing command is represented by one object; "editor" of the object indicates the type of command: EDIT_DEL indicates a delete-command, EDIT_DEL2 indicates a "un-tag" command, EDIT_DEL3 indicates a "level-up" command.

Example 10

Source code—file name: htmlEditor_js.txt, line numbers: 1970-1990, function name: stripTag The processes of Claim 3 create a set of editing commands targeting selected element. One editing command is a "un-tag" command. Function stripTag handles the Click event of the "un-tag" command. The function executes the "un-tag" operation by adding the element's children to the element's parent and then deletes the element. The "un-tag" operation cannot be applied to a table or list, so, the function simply deletes the element in such a situation.

Example 11

Source code—file name: htmlEditor_js.txt, line numbers: 2026-2041, function name: moveOutTag The processes of Claim 3 and Claim 4 create a set of editing commands targeting selected element. One editing command is a "level-up" command. Function moveOutTag handles the Click event of the "level-up" command. The function gets the grandparent of the element; removes the element and then adds the element to its original grandparent right after its original parent.

Example 12

Source code—file name: htmlEditor_js.txt, line numbers: 1591-1600, function name: stopTagClick The processes of Claim 3, Claim 4 and Claim 5 create a set of editing commands targeting selected element. One editing command is an "add space" command. It adds a space outside the end of current element so that the user may enter new contents outside of the current element. Function stopTagClick handles the Click event of the "add space" command. The function adds a SPAN element, containing one space, to the current element; call moveOutTag function (see Example 11) on the SPAN element so that the SPAN element becomes the next sibling of the current element; call stripTag function (see Example 10) on the SPAN element to remove the SPAN element but keep the space it contains. Thus a space is appended immediately outside of the current element.

Example 13

Source code—file name: htmlEditorClient_js.txt, line numbers: 1787-1795, function name: getDocType The processes of Claim 6 create a virtual property for viewing and setting DOCTYPE of the web page being edited. Function getDocType returns the value for said virtual property. If the variable for DOCTYPE has value then the function returns it; if the variable for DOCTYPE does not have value then the function calls function getDocTypeString (see Example 14) to get DOCTYPE value.

Example 14

Source code—file name: htmlEditorClient_js.txt, line numbers: 170-187, function name: getDocTypeString The processes of Claim 6 create a virtual property for viewing and setting DOCTYPE of the web page being edited. Function getDocTypeString returns the web page DOCTYPE setting; the returned setting is the value in the web page file, not the setting currently made by the user. The DOCTYPE setting takes effect only by reloading the web page. Function getDocType (see example 13) returns the current user setting.

Example 15

Source code—file name: htmlEditor_js.txt, line numbers: 7523-7527, the line 7523 contains following words: tagname: 'table'

The processes of Claim 7 access child elements of a selected element. In this example, for a <table> element 4 commands are added to the element-command-area of Claim 1 for the processes of Claim 7. Command "thead" is for selecting <THEAD> element of the <table>; command 'tfoot" is for selecting <TFOOT> element of the <table>; command "addHeader" is for creating a <THEAD> eleent in the <table>; command "addFooter" is for creating a <TFOOT> element in the <table>.

Example 16

Source code—file name: htmlEditor_js.txt, line Number: 7416, the line contains following words: {name: 'head', editor: EDIT_GO, cmdText: 'show page head', action: gotoPageHead}

The processes of Claim 7 access child elements of a selected element. In this example, when the <HTML> element is selected a "head" command is added to the element-command-area of Claim 1 for the processes of Claim 7. The "head" command is for selecting <HEAD> element.

Example 17

Source code—file name: htmlEditor_js.txt, line numbers: 7438-7446, the line 7438 contains following words: tagname: 'head'

The processes of Claim 7 access child elements of a selected element. In this example, when the <HEAD> element is selected via the "head" command (see Example 16), 4 commands are added to element-command-area of Claim 1: "addmeta" for adding a new <META> child element to the <HEAD> element; "addscript" for adding a new <SCRIPT> child element to the <HEAD> element; "addcss" for adding a new <LINK> child element to the <HEAD> element for a CSS file; "addlink" for adding a new <LINK> child element to the <HEAD> element. 4 groups of virtual properties are added to the <HEAD> element: "meta" group includes <META> elements; "script" group includes <SCRIPT> elements; "css" group includes <LINK> elements for CSS files; "link" group includes <LINK> elements for non-CSS files.

Example 18

Source code—file name: htmlEditor_js.txt, line numbers: 2005-2025, function name: gotoChildByTag The processes of Claim 7 access child elements of a selected element. In this example, when the "head" command (see Example 16), the "thead" command (see Example 15), or the "tfoot" command (see Example 15) are executed, function gotoChildByTag is executed. The function assumes there is only one child element for specified child type; it calls getElementsByTagName to locate the child element.

Example 19

Source code—file name: htmlEditorClient_js.txt, line numbers: 10, 1843-1868, function name: resetDynamicStyles The processes of Claim 8 create virtual properties for CSS styles. In this example, a constant string, 'dyStyle8831932', is defined for identifying "virtual property holder" of Claim 8 by the title of <STYLE> element. Function resetDynamicStyles is executed when a web page is loaded into the HTML editor. The function removes all <STYLE> elements if title of the elements is 'dyStyle8831932'; creates a new <STYLE> element and sets its title to 'dyStyle8831932'. Thus an empty "virtual property holder" is prepared for holding virtual property values.

Example 20

Source code—file name: htmlEditorClient_js.txt, line numbers: 573-605, function name: _getDynamicStyleNode The processes of Claim 8 create virtual properties for CSS styles. In this example, function _getDynamicStyleNode returns "virtual property holder" of Claim 8.

Example 21

Source code—file name: htmlEditorClient_js.txt, line numbers: 1054-1212, function name: _updateDynamicStyle The processes of Claim 8 create virtual properties for CSS styles. In this example, function _updateDynamicStyle saves a virtual property value into "virtual property holder" of Claim 8. It calls function _getDynamicStyleNode (see Example 20) to get the said "virtual property holder". If the CSS style already exists in the said "virtual property holder" then the value is updated for the existing style; if the CSS style does not exist then the style is added into the said "virtual property holder". If the value for the virtual property is empty then the CSS style is added to variable _removedCss, indicating that the style is to be removed; the default value of the CSS style is applied to the said "virtual property holder" so that the effects of removing the style are visible immediately to the user.

Example 22

Source code—file name: htmlEditorClient_js.txt, line numbers: 669-732, function name: _getDynamicCssText The processes of Claim 8 create virtual properties for CSS styles. In this example, function _getDynamicCssText returns a string representation of editing of CSS styles. The function returns the CSS text by processing and concatenating cssText property of each style in the "virtual property holder" of Claim 8. The major purpose of processing each cssText property is to solve web browser compatibility problem: some CSS styles are not defined in the same by different web browsers. This example only tries to solve the web browser compatibility problem between IE, Chrome, Opera, Firefox and Safari. Function _getDynamicCssText also returns removed CSS styles as a JSON string, as a beginning part of the return value, delimited by a string $$$, followed by processed CSS text of "virtual property holder" of Claim 8.

Example 23

Source code—file name: htmlEditor_js.txt, line numbers: 1219-1264, function name: finishEdit The processes of Claim 8 create virtual properties for CSS styles. In this example, function finishEdit is executed when saving the editing results. It gets HTML text of the page being edited; it removes the "virtual property holder" of Claim 8, from the HTML text. The results of editing are represented by two strings; one string is for HTML contents; another string is for CSS contents. The two strings are sent to web server for processing.

Example 24

Source code—file name: htmlEditor_js.txt, line numbers: 6259-6461, function name: _getresultHTML The processes of Claim 9 generate HTML contents as part of editing results. In this example, function _getresultHTML returns HTML contents as a string. In this example, a small red box, which is an IMG element, is used in the web page being edited. The red box is for indicating the base-element of Claim 1 on the web page. The function removes the red box from the page; forms HTML string as described in Claim 9; adds the red box back to the web page.

INDUSTRIAL APPLICABILITY

In-browser HTML editors have been used for web contents creation and editing, for example in web mail, blogs, forum message submissions, etc. Because this invention makes in-browser HTML editors much more powerful in visual editing capability than state-of-art editors, it will be possible to do complete remote web page creations in a cloud-computing environment.

The invention claimed is:

1. A method for creating an in-browser visual HTML editor by setting "contentEditable" attribute to "true" for a top level HTML element to be edited or body element of an html page if whole web page is to be edited, the method comprising: detecting a lowest level of HTML element at a caret, a caret is a point of text insertion, a web browser provides one single caret referred to as the caret, an HTML element is a lowest level element if it does not contain child HTML elements, a lowest level HTML element is referred to as a base-element, a base-element at the caret is referred to as the base-element; creating a list to show a text representation of the base-element and a text representation of each level of parent elements of the base-element; detecting item selection change of the said list to get an HTML element selection which is referred to as the selected HTML element or the selected element; creating areas to hold command-buttons specific to said selected HTML element, referred to as element-command-area; creating a table for displaying and editing all attributes of said selected HTML element, said table has one column for displaying attribute names and one column for displaying and editing attribute values; said table is referred to as "a Property Grid"; in said table there is one row displaying a virtual property for grouping CSS styles, it is referred to as a "virtual" property because it is not a property specified by standard HTML specifications and it works like a command by following definition: when a user sets a value to said virtual property the value is used as a class name by said selected HTML element, the class name indicated by original value of said virtual property value is removed from class names of said selected HTML element; said virtual property is referred to as "style name".

2. The method of claim 1, further comprising of a process of creating CSS virtual properties for the selected element defined in claim 1 for CSS styles supported by the selected element defined in claim 1, their values are shared between some elements in a way as defined below in this claim; each CSS virtual property is for a CSS style of the selected element defined in claim 1; each CSS virtual property is created for a CSS style with selector of said CSS style defined below: selector for said CSS styles is determined by tag name of the selected HTML element and value of "style name" of claim 1; if "style name" of the selected element defined in claim 1 is empty then the selector is the tag name of the selected element defined in claim 1; if "style name" of the selected element defined in claim 1 is not empty then the selector is the tag name of the selected element defined in claim 1 followed by a dot and followed by "style name" of the selected element defined in claim 1; value of a CSS virtual property is computed value of said CSS style; when a user sets a value to a CSS virtual property, the value is used as style value of said CSS style, if the value is empty or equals to default value according to standard HTML specifications for said CSS style then the style is removed from Cascade Style Sheet.

3. The method of claim 2, further comprising of a process of generating CSS text for CSS virtual property editing, the process comprising: adding a <STYLE> element to page head when the page is loaded into the in-browser HTML editor of claim 1, the said <STYLE> element is referred to as "virtual property holder"; when setting a CSS virtual property value the corresponding CSS style value is created in the "virtual property holder"; adding a variable to hold removed CSS styles; when setting a CSS virtual property to empty or to a default value of the corresponding CSS style the CSS style is added to the said variable; when saving the CSS virtual properties a Cascade Style Sheet file is generated and used by the page and CSS text of "virtual property holder" is merged into the Cascade Style Sheet file, CSS styles listed in the said variable are removed from the Cascade Style Sheet file, and the "virtual property holder" is removed from resulting HTML text.

4. The method of claim 1, further comprising of a process of creating following command-buttons of claim 1 according to the selected HTML element of claim 1, the command buttons are placed in element-command-area of claim 1: a delete-command for deleting the selected HTML element if the element can be deleted; a new-element-command for adding a new child HTML element at the caret position of claim 1; an "un-tag" command which is used for replacing the selected HTML element by its innerHTML contents, if such an operation is valid for the selected element and its parent element; a "search-element" command which is used for searching HTML element by tag name, by id, and by name, found HTML element becomes the base-element.

5. The method of claim 1, further comprising of a process of creating a "level-up" command among the command-buttons of the method of claim 1 if the selected HTML element is a grandchild element of any level of an element being edited; the "level-up" command makes the selected HTML element a sibling element of its parent element.

6. The method of claim 1, further comprising of a process of creating an "add space" command among the command-buttons of the method of claim 1 if the selected HTML element is a child element of an element being edited; the "add space" command inserts a space immediately outside of the selected element.

7. The method of claim 1, further comprising of a process of editing <!DOCTYPE> element of a web page being edited, the process comprising: adding a doctype variable in the HTML editor using a unique variable name; when the web page is loaded for editing, the said doctype variable is assigned value from web page's doctype attribute; when <HTML> element is selected in the Parent List of the method of claim 1 the value stored in the doctype variable becomes a property to be viewed and edited in the Property Grid of the method of claim 1; at the time of getting HTML text as the web page editing result, <!DOCTYPE> value stored in the doctype variable is inserted at the beginning of the result.

8. The method of claim 1, further comprising of a process of accessing child elements of the selected element defined in claim 1, the process comprising: for each allowed type of child element adding a command to the element-command-area of the said selected element for creating a new child element; adding each existing child element as one virtual property to the Property Grid of claim 1 for the said selected element, or adding one command to the element-commandarea of the said selected element; clicking on the said virtual property or the said command will make the corresponding child element the selected element and putting the child element into editing by listing all its attributes, virtual properties and related commands.

9. The method of claim 1, further comprising of a process of generating HTML text for a whole web page, the process comprising: remembering all HTML elements added to the web page being edited by the in-browser visual HTML editor of claim 1, those elements are used by the in-browser HTML editor of the method of claim 1, those elements are not web page contents created by the user, those elements are referred to as editor elements; before generating HTML text for the whole page, removing from the page being edited all said editor elements; generating HTML text by following formula: "<!DOCTYPE"+{value stored in the doctype variable of claim 6}+"><HTML>"+{innerHTML value of the <HTML> element, removing "virtual property holder" of claim 8}+"</HTML>"; adding all the editor elements back to the page being edited.

* * * * *